Figure 1:
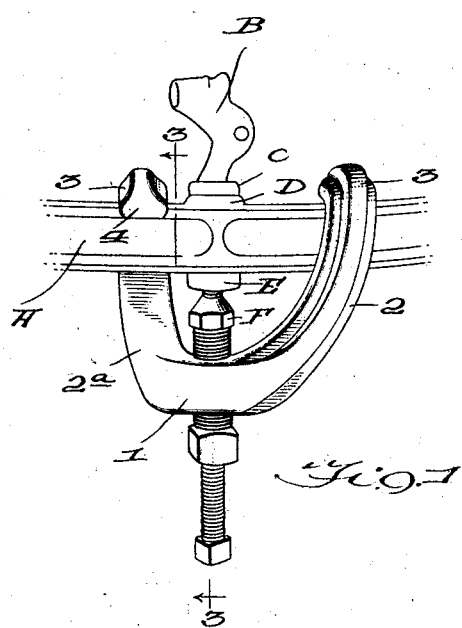

Sept. 27, 1932.   H. W. KULP ET AL   1,879,334
PERCH BOLT REMOVER
Filed Aug. 3, 1931

Inventor
Harry W. Kulp,
Martin C. Dellinger,
By Richard E. Babcock
Attorney

Patented Sept. 27, 1932

1,879,334

UNITED STATES PATENT OFFICE

HARRY W. KULP AND MARTIN C. DELLINGER, OF LANCASTER, PENNSYLVANIA

PERCH BOLT REMOVER

Application filed August 3, 1931. Serial No. 554,923.

This invention relates to tools for thrusting bolts and pins or the like from their cooperating bores in other bodies and is primarily intended for extracting the spring perches or bolts from the front axles of Ford automobiles, of both the Model A and the Model T type.

Normally these perches or bolts are drawn down very tightly by their cooperating nuts on the lower end portions, sustain heavy blows and great weight and usually do not require to be displaced or removed oftener than once in every two or three years, with the consequence that they stick very tightly in their cooperating bores and become "frozen" in position in said bores by the time it is necessary to remove them, so that the job of removing them has been, prior to this invention, a very difficult and time consuming operation.

The present invention has been evolved with the above considerations in view and has for its primary object to provide a sturdy tool which can be easily and quickly moved upward from below and hooked over the top of the front axle to engage the same on opposite sides of the perch bolt; to provide such a tool which will have opposed arms extending respectively from the front and rear of said axle so as to equalize the thrust of the screw elements and so resist displacement or misalignment of the screw in a direction transverse of the axle; to provide in such a tool means extending parallel to, and adapted to engage the respective front and rear faces of, the upper portions of said axle to resist any tendency of the tool as a whole toward sliding; to provide opposed supporting fingers spaced endwise of the axle and adapted to accommodate between them the perch bolt, spring shackle and any related parts, and so formed as to have a large bearing area on the top of the front axle; to so combine the means engaging the respective front and rear faces of the top portion of said axle with the bearing area of said supporting fingers as to resist any sliding tendency of the tool as a whole endwise of the axle when the tool as a whole is put under tension by the thrust of the screw against the end of the perch bolt; to provide a large starting sleeve adapted to exert powerful leverage against the perch for breaking the same free or starting it, in combination with a small diameter screw threaded through said sleeve and adapted to engage the end of the perch and to completely thrust the same from its socket after it has once been freed; and to provide a very simple, sturdy and efficient tool having the above characteristics and which is capable of very economical production on a large quantity basis.

In this application we show and describe only the preferred embodiment of our invention simply by way of illustration of the practice thereof, as by law required. However, we recognize that our invention is capable of other and different embodiments, and that the several details thereof may be modified. Therefore, the drawing and description herein are to be considered as merely illustrative and not as exclusive.

Figure 2:
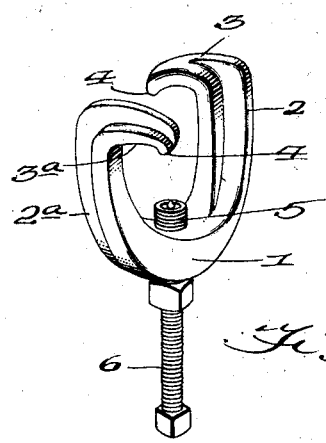
Figure 3:
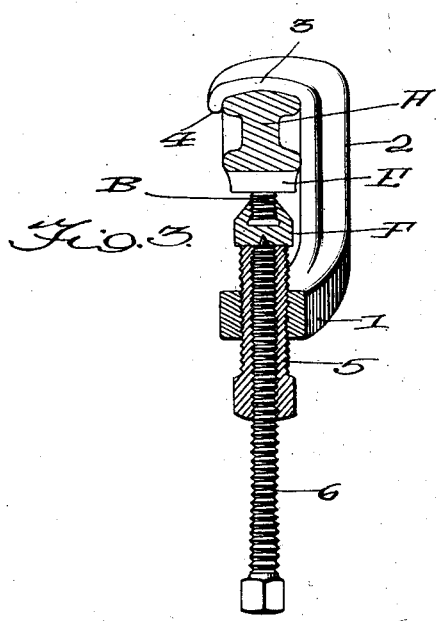
Figure 4:
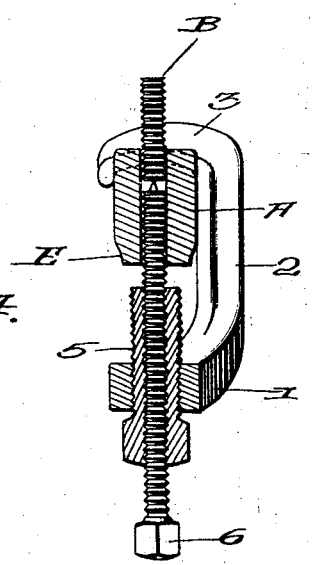

In the accompanying drawing:

Figure 1 illustrates a fragmentary front elevation of a front axle and associated parts including a perch bolt, with an extractor embodying our invention shown in front elevation as applied thereto, a protective nut F having been applied to the lower end of the spring perch;

Figure 2, a perspective view of our extractor;

Figure 3, a sectional view on the line 3—3 of Figure 1, looking in the direction of the arrows; and Figure 4, a vertical, central, sectional view taken on a line corresponding to the lower portion of line 2—2 and with the extractor screw 6 extending into the bore of the axle, the protecting nut F being removed and the spring perch C being nearly completely forced out of said bore.

Referring now in detail to the drawing, A designates the front axle; B, the spring perch or perch bolt; C, the enlarged or annular stop collar on said perch and which is drawn down tightly against the boss D surrounding the upper part of the vertical bore through the axle by means of the usual nut, not shown, applied to the lower end of the perch B, and bearing against the lower face of the boss E surrounding the lower end portion of said bore.

The elements referred to in the immediately foregoing paragraph are all well known elements as found in the present Model A Ford now in universal use in this country and form no part of our present invention, but are thus briefly referred to merely to promote a quick and more intelligent understanding of our present invention.

The tool of the present invention comprises a preferably malleable iron casting consisting of a body portion 1; two opposed respectively forwardly and rearwardly bent or curved upwardly extending arms 2 and 2a adapted to extend upwardly, to engage the front and rear faces respectively of the axle A; fingers 3 and 3a respectively preferably integral with the respective arms 2 and 2a and respectively extending rearwardly and forwardly in opposed relation across the top of the axle A; and lugs or cleats 4 respectively descending from the respective free ends of the fingers 3 and 3a and having generally vertical slightly curved faces in a vertical direction of a contour corresponding to the corresponding upper face portions of the respective front and rear of said front axle A to bear against the same. Said vertically extending engaging faces of said lugs or cleats 4 will preferably extend in a direction of the axle A parallel or substantially parallel to the opposed inner faces of their respective arms and preferably for a distance equal to the width in said direction of the said upper portions of their respective arms.

The lower or operative supporting or bearing faces of the fingers 3 and 3a respectively will preferably diverge downwardly to the front and rear from their medial portion on a gentle incline to conform to the contour of the upper face of the front axle A.

The fingers 3 and 3a will be spaced from each other for a distance greater than the width of the axle A whereby the tool may be turned at an angle to the position shown in Figure 1 so as to receive the axle in the space between said fingers 3a, whereby the tool may be moved upward in a vertical direction and partially rotated and dropped downward to the position shown in Figure 1.

Preferably the arm 2 will extend to a greater distance in the direction of the axle from the spring perch C than the arm 2a in order to provide sufficient space between the adjacent sides of the fingers 3 and 3a to permit the passage therebetween of the axle A and yet engage the axle by means of the finger 3a extending from arm 2a closely adjacent the spring perch C to avoid any possible springing of the axle.

The lower and substantially horizontal portion of the body 1 of the casting is formed with an internally screw-threaded large vertical bore which receives the externally screw-threaded starting sleeve or screw 5 threaded therein and said starting sleeve or screw 5 is longitudinally centrally bored, the said bore being internally screw-threaded to receive the long externally screw-threaded extractor screw or expelling screw 6 threaded in said latter bore.

Preferably said protecting nut 7 will be formed with a conical centering recess in the center of its lower face and the upper end of the extractor screw 6 will preferably be formed with a centrally disposed conical centering tip, as illustrated in Figures 2, 3 and 4.

In practice, the usual front spring, connecting shackle, front brake operating rod and front snubbers in the Model A Ford will of course be first disconnected from the spring perch or bolt B, as illustrated in Figure 1, and the usual nut, not illustrated, will be removed from the lower end of the spring perch or bolt and instead the protective nut F will be applied thereto, as illustrated in Figures 1 and 2; next, the tool will be turned substantially at right angles to the position shown in Figure 1 and will be shoved upward so as to receive the intervening transverse section of the axle A between the fingers 3 and 3a until the lugs or cleats 4 are above the top of the axle A, when the tool is to be turned about its axis until the opposed faces of the arms 2 and 2a are in contact with the front and rear faces respectively of the axle A, when the tool is to be released or dropped down until the lower faces of the fingers 3 and 3a rest on the top of the axle A with the cleats 4 in engagement respectively with the rear and front faces of the upper portions of said axle. If the centering pointed upper end of the screw 6 does not already project beyond the upper end of the starting screw 5 the screw 6 is to be turned up until its centering point does so project. With the screws 5 and 6 in the above relation, a wrench is to be applied to the squared or angular head of the starting screw 5 and the same is to be turned up tightly against the protective nut F, sufficient power being exerted against the screw 5 to break the adhesion between the bolt B and its socket in said axle A. When such breaking or starting of the spring perch or bolt B has been accomplished the bolt or starting sleeve 5 is turned downward and outward sufficiently to permit the protective nut F to be removed from the lower end of the spring perch or bolt B and thereafter, at least preferably, the starting sleeve 5 is again turned upward until the upper end of the expelling or extractor screw 6 engages the end of the spring perch or bolt B and thereafter the expelling or extractor screw 6 is turned or screwed up so as to extend well into the bore of the axle A, as illustrated in Figure 4, to force the spring perch or bolt B upward out of said bore and said expelling or extractor screw 6 is of such length that when said sleeve 5 and said extractor screw 6 have both been turned upward to their extreme limits the screw 6 will extend entirely through the axle A.

Having thus described our invention, what we claim as new and desire to secure by United States Letters Patent is:

1. A spring perch extractor comprising a gripping element, said element comprising a body portion, a rearwardly and upwardly bent arm extending from one end of said body, a forwardly and upwardly bent arm extending from the other end of said body, two supporting fingers extending forwardly and rearwardly substantially parallel to each other from the upper ends of the respective arms, and having downwardly presented faces preferably in endwise registry with each other and of such length from front to rear as to extend across the face of an automobile front axle to which they are to be applied and substantially corresponding in form to the cross-sectional profile of the upper face of said axle, the supporting faces of said fingers in the direction of the length of said axle substantially corresponding in width to the width of the upper portions of the adjacent faces of their respective arms, and lugs depending downwardly from the free end portions of said fingers and having operative faces extending lengthwise of the axle for substantially the width of their respective fingers and adapted to engage the respective front and rear faces of the upper portion of the axle, said fingers being spaced from each other lengthwise of the gripping element a distance in excess of the width of the axle to permit the application of the gripping element to the axle, one of said arms being extended lengthwise of said element to a greater distance from the center of the body of said element than the other arm thereof whereby the necessary spacing of the fingers is obtained and whereby in use one of the fingers will bear on the upper face of the axle closely adjacent the spring perch to prevent deformation of the axle between the gripping fingers, the upper portions of the opposed faces of said arms lying in substantially parallel planes spaced from each other for a distance substantially equal to the width of the axle to which the gripping element is to be applied and in the same plane as, and parallel to, the operative vertical faces of the lugs depending from the fingers extending from the respective arms, the relation of the operative faces of the upper portion of each arm, its supporting finger and cooperating lug being such as to just snugly receive and fit against one vertical face, across the top, and against the upper portion of the other vertical face of the axle with a substantial bearing surface in the direction of the length of the axle, in combination with a powerful leverage starting screw-sleeve threaded through said body and adapted to exert a powerful thrust against the lower end of said spring perch through the intermediary of a thread protective nut applied to the lower end of said perch and in a vertical line closely adjacent one of said gripping fingers, and an extractor or expelling screw threaded through said sleeve and adapted to engage the lower end of said perch and to force said perch upward completely out of its bore in the axle after said protective nut shall have been removed from said perch, said extractor screw being of such length with relation to said sleeve, gripping element and axle that it may be turned up so as to project entirely through the spring perch bore of the axle.

2. A spring perch extractor comprising a gripping element, said element comprising a body portion, a rearwardly and upwardly bent arm extending from one end of said body, two supporting fingers extending forwardly and rearwardly substantially parallel to each other from the upper ends of the respective arms, and having downwardly presented faces preferably in endwise registry with each other and of such length from front to rear as to extend across the face of an automobile front axle to which they are to be applied and substantially corresponding in form to the cross-sectional profile of the upper face of said axle, the supporting faces of said fingers in the direction of the length of said axle substantially corresponding in width to the width of the upper portions of the adjacent faces of their respective arms, and lugs depending downwardly from the free end portions of said fingers and having operative faces extending lengthwise of the axle for substantially the width of their respective fingers and adapted to engage the respective front and rear faces of the upper portion of the axle, said fingers being spaced from each other lengthwise of the gripping element a distance in excess of the width of the axle to permit the application of the gripping element to the axle, one of said arms being extended lengthwise of said element to a greater distance from the center of the body of said element than the other arm thereof whereby the necessary spacing of the fingers is obtained and whereby in use one of the fingers will bear on the upper face of the axle closely adjacent the spring perch to prevent deformation of the axle between the gripping fingers, the upper portions of the opposed faces of said arms lying in substantially parallel planes spaced from each other for a distance substantially equal to the width of the axle to which the gripping element is to be applied and in the same plane as, and parallel to, the operative vertical faces of the lugs depending from the fingers extending from the respective arms, the relation of the operative faces of the upper portion of each arm, its supporting finger and cooperating lug being such as to just snugly receive and fit against one vertical face, across the top, and against the upper portion of the other vertical face of the axle with a substantial bearing surface in the direction of the length of the axle.

3. A spring perch extractor comprising a gripping element, said element comprising a body portion, a rearwardly and upwardly bent arm extending from one end of said body, a forwardly and upwardly bent arm extending from the other end of said body, two supporting fingers extending forwardly and rearwardly substantially parallel to each other from the upper ends of the respective arms, and having downwardly presented faces of such length from front to rear as to extend across the face of an automobile front axle to which they are to be applied and substantially corresponding in form to the cross-sectional profile of the upper face of said axle, and lugs depending downwardly from the free end portions of said fingers and having operative faces adapted to engage the respective front and rear faces of the upper portion of the axle, said fingers being spaced from each other lengthwise of the gripping element a distance in excess of the width of the axle to permit the application of the gripping element to the axle, one of said arms being extended lengthwise of said element to a greater distance from the center of the body of said element than the other arm thereof, the upper portions of the opposed faces of said arms lying in substantially parallel planes spaced from each other for a distance substantially equal to the width of the axle to which the gripping element is to be applied and in the same planes as, and parallel to, the operative vertical faces of the lugs depending from the fingers extending from the respective arms, the relation of the operative faces of the upper portion of each arm, its supporting finger and cooperating lug being such as to just snugly receive and fit against one vertical face, across the top, and against the upper portion of the other vertical face of the axle with a substantial bearing surface in the direction of the length of the axle, in combination with a powerful leverage starting screw-sleeve threaded through said body and adapted to exert a powerful thrust against the lower end of said spring perch through the intermediary of a thread protective nut applied to the lower end of said perch and in a vertical line closely adjacent one of said gripping fingers, and an extractor or expelling screw threaded through said sleeve and adapted to engage the lower end of said perch and to force said perch upward completely out of its bore in the axle after said protective nut shall have been removed from said perch, said extractor screw being of such length with relation to said sleeve, gripping element and axle that it may be turned up so as to project entirely through the spring perch bore of the axle.

4. A spring perch extractor comprising a gripping element, said element comprising a body portion, a rearwardly and upwardly bent arm extending from one end of said body, a forwardly and upwardly bent arm extending from the other end of said body, two supporting fingers extending forwardly and rearwardly substantially parallel to each other from the upper ends of the respective arms, and having downwardly presented faces of such length as to extend over the top face of an automobile front axle to which they are to be applied, said fingers being spaced from each other lengthwise of the gripping element a distance sufficient to permit the application of the gripping element to the axle, the upper portions of the opposed faces of said arms lying in substantially parallel planes spaced from each other for a distance substantially equal to the width of the axle to which the gripping element is to be applied, in combination with a powerful leverage starting screw-sleeve threaded through said body and adapted to exert a powerful thrust against the lower end of said spring perch through the intermediary of a thread protective nut applied to the lower end of said perch and in a vertical line closely adjacent one of said gripping fingers, and an extractor or expelling screw threaded through said sleeve and adapted to engage the lower end of said perch and to force said perch upward completely out of its bore in the axle after said protective nut shall have been removed from said perch, said extractor screw being of such length with relation to said sleeve, gripping element and axle that it may be turned up so as to project entirely through the spring perch bore of the axle.

5. A spring perch extractor comprising a gripping element, said element comprising a body portion, a rearwardly and upwardly bent arm extending from one end of said body, a forwardly and upwardly bent arm extending from the other end of said body, two supporting fingers extending forwardly and rearwardly substantially parallel to each other from the upper ends of the respective arms, and having downwardly presented faces of such length as to extend over the top face of an automobile front axle to which they are to be applied, said fingers being spaced from each other lengthwise of the gripping element a distance sufficient to permit the applications of the opposed faces of said arms lying in substantially parallel planes spaced from each other for a distance substantially equal to the width of the axle to which the gripping element is to be applied.

6. A spring perch extractor comprising a gripping element, said element having a portion adapted to be disposed in alignment with the spring perch, comprising a body portion, a pair of arms respectively bent upward in spaced relation to each other from said body, two supporting fingers respectively carried by the respective arms and parallel to each other and having downwardly presented faces of such length from front to rear as to extend across the face of an automobile front axle to which they are to be applied and substantially corresponding in form to the cross-sectional profile of the upper face of said axle, and lugs depending downwardly from the free end portions of said fingers and respectively adapted to engage the face of the upper portion of the axle remote from the opposed faces of their respective corresponding arms, said fingers being spaced from each other lengthwise of said gripping element and in use engaging the top of the front axle on opposite sides of the spring perch, the upper portions of the operative faces of said arms lying substantially parallel to each other, the relation of the operative faces of the upper portion of each arm, its supporting finger and cooperating lug being such as to just snugly receive and fit about one vertical face, across the top, and against the upper portion of the other vertical face of the axle, in combination with a powerful leverage starting screw-sleeve threaded through said body and adapted to exert a powerful thrust against the lower end of said spring perch through the intermediary of a thread protective nut applied to the lower end of said perch and in a vertical line closely adjacent one of said gripping fingers, and an extractor or expelling screw threaded through said sleeve and adapted to engage the lower end of said perch and to force said perch upward completely out of its bore in the axle after said protective nut shall have been removed from said perch, said extractor screw being of such length with relation to said sleeve, gripping element and axle that it may be turned up so as to project entirely through the spring perch bore of the axle.

7. A spring perch extractor comprising a gripping element, said element having a portion adapted to be disposed in alignment with the spring perch, comprising a body portion, a pair of arms respectively bent upward in spaced relation to each other from said body, two supporting fingers respectively carried by the respective arms and extending substantially parallel to each other and having downwardly presented faces of such length from front to rear as to extend across the face of an automobile front axle to which they are to be applied and substantially corresponding in form to the cross-sectional profile of the upper face of said axle, and lugs depending downwardly from the free end portions of said fingers and respectively adapted to engage the face of the upper portion of the axle remote from the opposed faces of their respective corresponding arms, said fingers being spaced from each other lengthwise of said gripping element and in use engaging the top of the front axle on opposite sides of the spring perch, the upper portions of the operative faces of said arms lying substantially parallel to each other, the relation of the operative faces of the upper portion of each arm, its supporting finger and cooperating lug being such as to just snugly receive and fit about one vertical face, across the top, and against the upper portion of the other vertical face of the axle.

8. A spring perch extractor comprising a gripping element, said element having a portion adapted to be disposed in alignment with the spring perch, comprising a body portion, a pair of arms respectively bent upward in spaced relation to each other from said body, two supporting fingers respectively carried by the respective arms and extending substantially parallel to each other and having downwardly presented faces of such length from front to rear as to extend across the face of an automobile front axle to which they are to be applied and substantially corresponding in form to the cross-sectional profile of the upper face of said axle, and lugs depending downwardly from the free end portions of said fingers and respectively adapted to engage the face of the upper portion of the axle remote from the opposed faces of their respective corresponding arms, said fingers being spaced from each other lengthwise of said gripping element and in use engaging the top of the front axle on opposite sides of the spring perch, the upper portions of the operative faces of said arms lying substantially parallel to each other, the relation of the operative faces of the upper portion of each arm, its supporting finger and cooperating lug being such as to just snugly receive and fit about one vertical face, across the top, and against the upper portion of the other vertical face of the axle, in combination with a powerful leverage starting screw-sleeve threaded through said body and adapted to exert a powerful thrust against the lower end of said spring perch through the intermediary of a thread protective nut applied to the lower end of said perch, and an extractor or expelling screw threaded through said sleeve and adapted to engage the lower end of said perch and to force said perch upward out of its bore in the axle.

9. A spring perch extractor comprising a gripping element, said element comprising a body portion, arms extending upwardly and formed with portions adapted to hook over a face of an automobile front axle to which they are to be applied in spaced relation to each other on opposite sides of the spring perch, in combination with a powerful leverage starting screw-sleeve threaded through said body and adapted to exert a powerful thrust against the lower end of said spring perch, and an extractor or expelling screw threaded through said sleeve and adapted to engage the lower end of said perch and to force said perch upward completely out of its bore in the axle, said extractor screw being of such length with relation to said sleeve, gripping element and axle that it may be turned up so as to project entirely through the spring perch bore of the axle.

10. A spring perch extractor comprising a gripping element, said element comprising a body portion, arms extending upwardly and formed with portions adapted to hook over a face of an automobile front axle to which they are to be applied in spaced relation to each other on opposite sides of the spring perch, in combination with a powerful leverage screw-sleeve threaded through said body and adapted to exert a powerful thrust against the lower end of said spring perch, and an extractor or expelling screw threaded through said sleeve and adapted to engage the lower end of said perch and to force said perch upwardly completely out of its bore in the axle.

11. A spring perch extractor comprising a gripping element, said element comprising a body portion, a rearwardly and upwardly bent arm extending from one end of said body, a forwardly and upwardly bent arm extending from the other end of said body, two supporting fingers extending forwardly and rearwardly substantially parallel to each other from the upper ends of the respective arms, and having downwardly presented faces of such length from front to rear as to extend across the face of an automobile front axle to which they are to be applied, and lugs depending downwardly from the free end portions of said fingers and having operative faces adapted to engage the respective front and rear faces of the upper portion of the axle, said fingers being spaced from each other lengthwise of the gripping element a distance in excess of the width of the axle, the upper portions of the opposed faces of said arms lying in substantially parallel planes spaced from each other for a distance substantially equal to the width of the axle to which the gripping element is to be applied.

In testimony whereof, we have signed our names to this specification at Lancaster, Pennsylvania, this 31st day of July, 1931.

HARRY W. KULP.
MARTIN C. DELLINGER.